April 3, 1945.  R. C. WILES  2,372,920
VALVE FOR PNEUMATIC TOOLS
Filed May 5, 1942
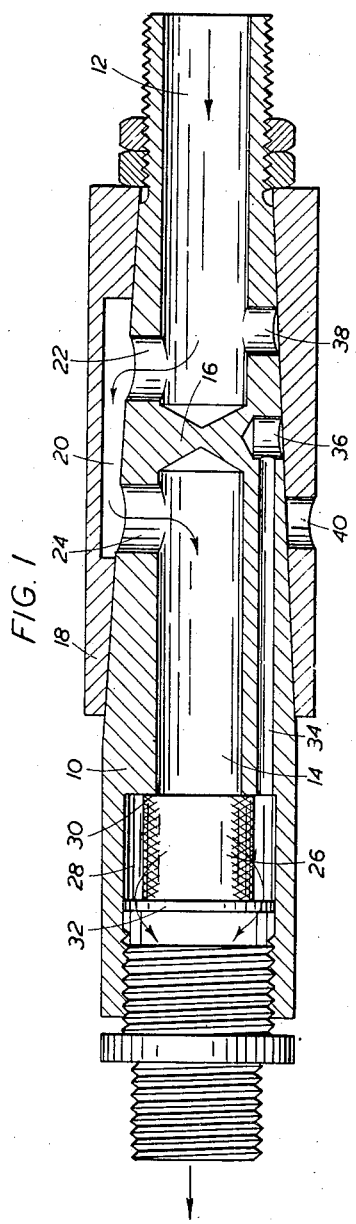
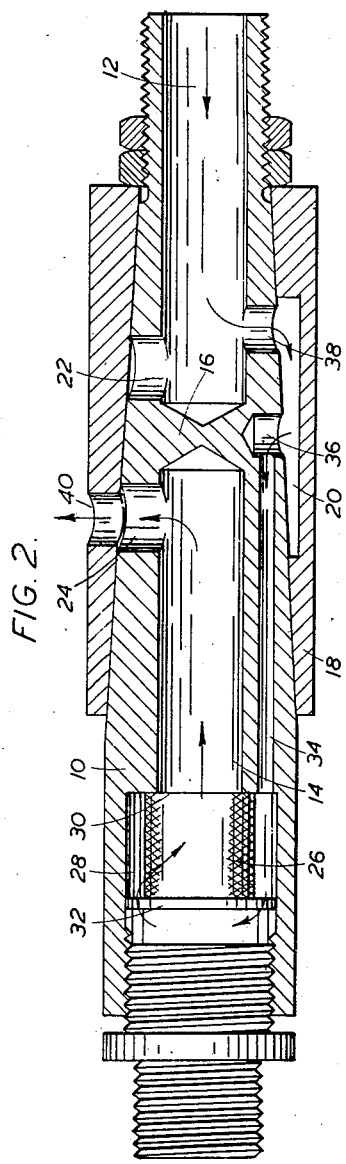
INVENTOR
R. C. WILES.
BY
ATTORNEYS Patented Apr. 3, 1945

2,372,920

UNITED STATES PATENT OFFICE 2,372,920

VALVE FOR PNEUMATIC TOOLS

Robert Clough Wiles, Newcastle-on-Tyne, England, assignor to Charles Crofton and Company (Engineers) Limited, Wallsend-on-Tyne, England, a British company Application May 5, 1942, Serial No. 441,847
In Great Britain May 19, 1941

3 Claims. (Cl. 183—39)

This invention relates to a valve for controlling the supply of compressed air to pneumatic tools, this valve including a filter and the valve body being formed with a by-pass port and the movable part thereof with an exhaust passage, so that when the said movable part is in a certain position air is admitted to a part of the inlet pipe beyond the filter, through which it returns and escapes through the exhaust passage, thereby cleaning the filter.

The present invention has for its object to provide improved facilities for cleaning the filter in that type of compressed air valve in which the movable member is a sleeve surrounding a tubular valve body which is interposed in the pipe line, the sleeve being rotated about the axis of the valve body in one direction to admit compressed air and in the other direction to shut off the air.

According to this invention the valve body is formed with a by-pass duct leading from a port under the control of the sleeve to a part of the inlet pipe beyond the filter, and an exhaust aperture is provided which is normally closed by the sleeve but is uncovered as a consequence of the movement of the sleeve to the position in which it admits compressed air to the aforesaid port.

Referring to the accompanying drawing—

Figures 1 and 2 are longitudinally sectional views of a valve according to this invention in two different positions.

Referring to the drawing, the valve body 10 is bored from each end, but the two bores 12 and 14 do not meet; a partition 16 of metal is left between their ends. The outer surface of the valve body is conical, having a taper similar to that of a plug valve, and a sleeve 18 surrounding the valve body has its internal surface similarly tapered. This inner surface is formed with a recess 20 at one side into which each of the bores 12, 14 in the valve body communicates through separate side openings 22, 24 respectively when the sleeve is in the angular position shown in Figure 1. Thus, air entering the bore 12 escapes into the recess 20 through its side opening 22 and from there enters the other bore 14 through the second side opening 24 and thus reaches the tool. On its way to the tool it passes through the walls of a cylindrical gauze filter 26 which is housed in an enlarged continuation 28 of the second bore 14 and is clamped between the shoulder 30 at the base of the enlargement and a disc 32 closing and abutting against the end of the filter. The supply of compressed air is shut off by rotating the sleeve, the two positions being indicated by a pointer (not shown) which can be brought into register for example with two marks, one of which is designated "open" and the other "closed."

A by-pass duct 34 of restricted diameter is formed in the valve body, extending between the aforesaid shoulder 30 at a point outside the cylindrical gauze filter 26 and a port 36 breaking through the outer surface of the valve body 10 at a point diametrically opposite to the two side openings 22 and 24. A third side opening 38 on the same side of the valve body as the port 36 extends from the central bore 12, to which compressed air is supplied, to the outer surface of the valve body. When, therefore, the sleeve is turned through 180 degrees from the "open" position of Figure 1, to the position shown in Figure 2, the recess 20 in the sleeve will establish communication between the third side opening 38 and the port 36, so that compressed air flows by way of the recess 20 in the sleeve and the by-pass duct 34 to the annular space between the filter 26 and the inner surface of the enlargement 28. Air passing inwards from the filter cleans it and this air escapes through the side opening 24, and through a hole 40 in the side of the sleeve which is in register with this side opening at this time as seen in Figure 2. This hole 40 is of course on the opposite side of the valve body, 180 degrees away from the second side opening, when the sleeve is in the "open" position, as shown in Figure 1. The "closed" position is intermediate between the "open" and "cleaning" positions, the latter position being indicated for example by the word "clean."

It will be appreciated that when the sleeve is set to the "clean" position the air has to pass through passages of restricted cross-section before reaching the filter, with the result that the velocity of the air in the pipe leading to the valve is restricted, being not greater than the velocity of the flow when the tool is being operated. Consequently there is no risk of pieces of scale or other gritty particles, which may be lying dormant in the pipe, being carried into the part of the valve body beyond the filter, from which they would be blown into the tool when the sleeve is next turned to the "on" position.

I claim:

1. A valve for controlling the supply of compressed air to pneumatic tools comprising a valve body of circular cross section having two passages therein which do not meet, one for the entry and one for the delivery of air, a sleeve surrounding and rotatable on said valve body, a recess in said sleeve, openings in said valve body at one side thereof one leading to the said passage for entry of air and the other leading to the said passage for the delivery of air, said openings being so situated as both to communicate with the recess in said sleeve in one position thereof, a filter within said valve body on the delivery side thereof, said valve body being also formed with a passage of restricted cross section leading from a port opening through the side of the valve body within the part surrounded by said sleeve to a part of the interior of the valve body beyond the said filter, and said sleeve being formed with an outlet, at a point distant from said recess therein, and so situated that when said recess is brought into communication with said port on the turning of said sleeve, the said outlet also comes into register with said opening in the valve body leading to the passage for delivery of air.

2. A valve according to claim 1 wherein said two passages in the valve body are axially formed therein with a partition between them, and said two openings are adjacent one another, one at one side and the other at the other side of said partition, and wherein the recess in the said sleeve is situated at one side of the sleeve, and the outlet in said sleeve adapted to register with the port in the valve body is at the opposite side of said sleeve.

3. A valve according to claim 1, wherein the valve body has an additional opening therein communicating with the said passage for entry of air at the side thereof opposite to that from which the first mentioned passage extends, said additional opening being so disposed that it will communicate with the recess in said sleeve when the sleeve is in the position in which said recess communicates with said port leading to said passage of restricted cross section.

ROBERT CLOUGH WILES.